United States Patent

Shyu

[19]

[11] Patent Number: 6,111,845
[45] Date of Patent: Aug. 29, 2000

[54] RECORD CARRIER, AND RECORDING METHOD AND APPARATUS FOR RECORDING AUDIO PROGRAMS ON A TRACK OF A RECORD CARRIER

[75] Inventor: Rong-Fuh Shyu, Hsinchu, Taiwan

[73] Assignee: Winbond Electronics Corp., Taiwan

[21] Appl. No.: 09/092,679

[22] Filed: Jun. 5, 1998

[51] Int. Cl.[7] .................................................. G11B 7/00
[52] U.S. Cl. ...................................... 369/124.08; 369/47
[58] Field of Search ............................. 369/47, 48, 49, 369/53, 54, 58, 59, 124.06, 124.07, 124.08; 360/24

[56] References Cited

U.S. PATENT DOCUMENTS

| | | |
|---|---|---|
| 4,729,043 | 3/1988 | Worth . |
| 4,794,465 | 12/1988 | Van Luyt et al. . |
| 5,390,159 | 2/1995 | Schylander . |
| 5,602,815 | 2/1997 | Klappert et al. . |

Primary Examiner—Paul W. Huber
Attorney, Agent, or Firm—Fish & Richardson P.C.

[57] ABSTRACT

A record carrier includes at least one track having at least one block. The block includes a plurality of interleaved compressed audio programs, and is grouped into a number of consecutive sub-blocks. Each of the compressed audio programs is segmented to form a number of consecutive audio sectors that is equal in number to the sub-blocks. The audio sectors of the compressed audio programs are arranged among the sub-blocks such that a jth one of the audio sectors of each of the compressed audio programs is disposed in a jth one of the sub-blocks. Moreover, in a recording method and apparatus for recording a plurality of input audio programs on a track of a record carrier, the input audio programs are first compressed to obtain a plurality of compressed audio programs. The compressed audio programs are then segmented into equal numbers of consecutive compressed audio program segments, and the compressed audio programs segments of the compressed audio programs are subsequently interleaved by grouping together jth ones of the compressed audio program segments of the compressed audio programs in a jth one of an ascending order of consecutive groups to form a block.

42 Claims, 6 Drawing Sheets

RECORD CARRIER, AND RECORDING METHOD AND APPARATUS FOR RECORDING AUDIO PROGRAMS ON A TRACK OF A RECORD CARRIER

BACKGROUND OF THE INVENTION

1. Field of the Invention

The invention relates to a record carrier having compressed audio programs recorded on a track thereof, and to a recording method and apparatus for recording audio programs on a track of a record carrier.

2. Description of the Related Art

The compact disc (CD) digital audio that was invented in the 1980s is a good media for digitally recording stereo audio information with high fidelity. The advantages of using digital technology to represent audio and video signals are apparently known in the art. Aside from the benefit of good quality when audio and video signals are recorded digitally, the manufacturing cost of CD media has become cheaper in recent years, thereby facilitating the progress of digital recording for audio and video signals.

Recent advancements in the field of video compression have made it possible to record video signals in CD media. A video CD with the same physical structure as the CD digital audio was proposed by adopting Motion Pictures Expert Group (MPEG) compressed video and audio to record a total of 74-minute length programs on a CD medium. The bit rate of compressed video is about 1.15 Mbits/sec, while that of compressed audio is about 224 Kbits/sec. These bit rates are designed for accommodating the constant linear velocity of the CD drive of a playback apparatus, which is at about 1.5 Mbits/sec. The video CD can also record some playback control data for interactive operation when the programs are played back.

Figure 1:
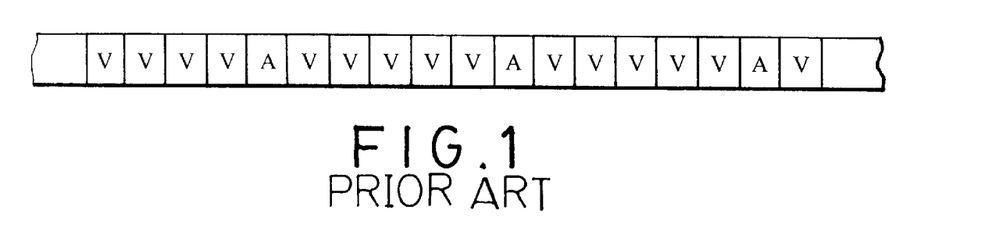
FIG. 1 illustrates how video and audio sectors of a compressed program are interleaved when recorded on a conventional video CD.

FIG. 1 shows the data structure of a program that contains both audio and video information in a video CD. As illustrated, the video information is segmented and then formatted into video sectors (V) of the same length. The audio information is also segmented and then formatted into audio sectors (A). The video and audio sectors (V, A) are subsequently interleaved at about a 5:1 ratio to ensure real-time delivery when they are read during playback. It is not necessary to keep this ratio as long as no overflow or underflow occurs when the video CD is read. The interleaved video and audio sectors (V, A) constitute a program that may be logically called a file or a track in video CD terminology. The program may be a music video, a karaoke song, a movie, or an audio/video clip. There may be many files or tracks on a single video CD.

Figure 2:
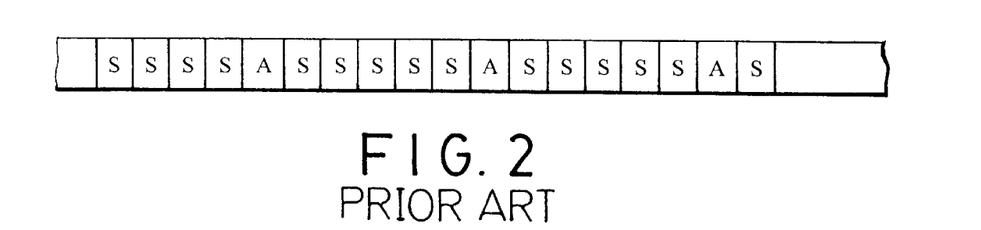
FIG. 2 illustrates how stuffing sectors can be interleaved with audio sectors of a compressed audio program for recording on a conventional video CD.
Figure 3:
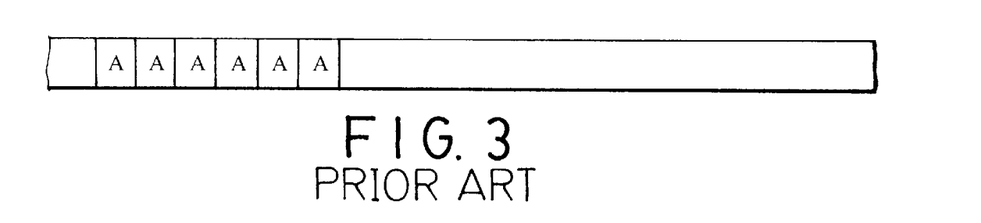
FIG. 3 illustrates how audio sectors of a compressed audio program can be clustered for recording on a conventional video CD.

The video CD can be used to store only compressed audio programs. Compared to the original CD digital audio, this offers the potential of permitting the CD medium to store more audio data bits, i.e. about six times that of the original CD digital audio with comparable quality, and with the interactive capability. However, problems arise when only compressed audio programs are recorded on a video CD due to the fact that the compressed audio bit rate is much lower than the constant linear velocity of the CD drive. An arrangement, like that shown in FIG. 2, utilizes stuffing sectors (S) that are interleaved with the audio sectors (A) so that a total bit rate equal to the constant linear velocity of the CD drive can be retained. While the arrangement of FIG. 2 resolves the problem of delivery rate, the recording capacity of the CD medium is used inefficiently. Another arrangement, such as that shown in FIG. 3, clusters all of the audio sectors (A) to ensure a high recording density. However, the arrangement of FIG. 3 requires the CD drive to alternate frequently between stalling and advancing states, and will consequently result in serious degradation of the CD drive.

SUMMARY OF THE INVENTION

Therefore, the object of the present invention is to provide a record carrier having a high density of compressed audio programs recorded on a track thereof without requiring a CD drive to alternate frequently between stalling and advancing states when the audio programs are read from the record carrier.

Another object of the present invention is to provide a recording method and apparatus for recording a high density of compressed audio programs on a track of a record carrier while obviating the drawback of requiring a CD drive to alternate frequently between stalling and advancing states when the audio programs are read from the record carrier.

According to one aspect of the invention, a record carrier, such as a compact disc, comprises at least one track having at least one block. The block includes a plurality of interleaved compressed audio programs, and is grouped into a number of consecutive sub-blocks. Each of the compressed audio programs is segmented to form a number of consecutive audio sectors that is equal in number to the sub-blocks. The audio sectors of the compressed audio programs are arranged among the sub-blocks such that a jth one of the audio sectors of each of the compressed audio programs is disposed in a jth one of the sub-blocks.

Preferably, the compressed audio programs are assigned with an ascending order of program numbers, and the audio sectors in each of the sub-blocks are arranged in the ascending order of the compressed audio programs to which the audio sectors belong.

In the disclosed embodiment, each of the audio sectors includes a SYNC field for storing a SYNC word, an ID field for storing an ID code that is unique for each of the audio sectors, and a data field. Each of the audio sectors further includes an error management code field for storing an error management code.

According to another aspect of the invention, a recording method for recording a plurality of input audio programs on a track of a record carrier comprises the step of compressing the input audio programs to obtain a plurality of compressed audio programs. The compressed audio programs are segmented into equal numbers of consecutive compressed audio program segments, and the compressed audio programs segments of the compressed audio programs are interleaved by grouping together jth ones of the compressed audio program segments of the compressed audio programs in a jth one of an ascending order of consecutive groups to form a block.

The recording method further comprises the steps of wrapping each of the compressed audio program segments with a SYNC word and an ID code that is unique for each of the compressed audio program segments to form audio sectors corresponding to the compressed audio program segments, and recording the audio sectors on the track of the record carrier.

Preferably, each of the compressed audio program segments is further wrapped with an error management code that includes at least one of an error detection code and an error correction code.

According to still another aspect of the invention, a recording apparatus for recording a plurality of input audio programs on a track of a record carrier, such as a compact disc, comprises an audio compressor, segmentation means and interleaving means. The audio compressor is adapted to compress the input audio programs to obtain a plurality of compressed audio programs. The segmentation means is connected to the audio compressor and is responsible for segmenting the compressed audio programs into equal numbers of consecutive compressed audio program segments. The interleaving means is connected to the segmentation means and is responsible for interleaving the compressed audio programs segments by grouping together jth ones of the compressed audio program segments of the compressed audio programs in a jth one of an ascending order of consecutive groups to form a block.

In the preferred embodiment, the compressed audio programs are assigned with an ascending order of program numbers, and the compressed audio program segments in each of the groups are arranged by the interleaving means in the ascending order of the compressed audio programs to which the compressed audio program segments belong.

Preferably, the segmentation means comprises a storage device for storing the compressed audio programs from the audio compressor therein, and a segmentation controller for segmenting the compressed audio programs in the storage device into the consecutive compressed audio program segments that are stored in the storage device. The interleaving means is controlled by the segmentation controller to read and output sequentially the groups of the compressed audio program segments in the storage device.

The recording apparatus further comprises a SYNC generator for generating a SYNC word, an ID generator for generating an ID code that is unique for each of the compressed audio program segments outputted by the interleaving means, a sector format multiplexer controlled by the segmentation controller so as to wrap each of the compressed audio program segments outputted by the interleaving means with the SYNC word from the SYNC generator and the respective ID code from the ID generator to form audio sectors corresponding to the compressed audio program segments, and a recording mechanism adapted to record the audio sectors on the track of the record carrier.

In the preferred embodiment, an error management code generator is connected to the interleaving means and the sector format multiplexer, and generates an error management code for each of the compressed audio program segments from the interleaving means. The sector format multiplexer further wraps each of the compressed audio program segments outputted by the interleaving means with the respective error management code from the error management code generator.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 4:
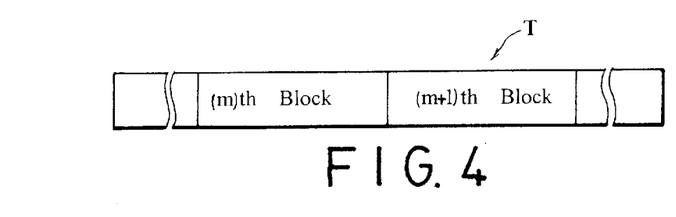
FIG. 4 illustrates a track of the preferred embodiment of a record carrier according to the present invention.
Figure 5:
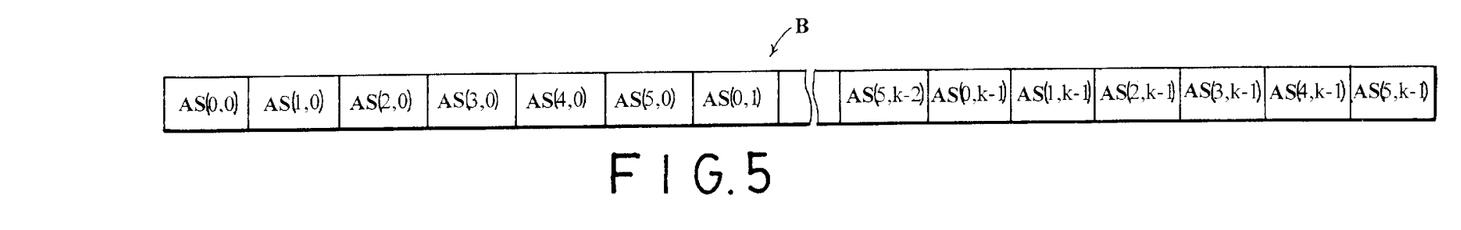
FIG. 5 illustrates a block of the track shown in FIG. 4.

The preferred embodiment of a record carrier according to the present invention is in the form of a compact disc that includes a number of tracks. As shown in FIG. 4, each track (T) includes a number of blocks (B). As shown in FIG. 5, each block (B) includes a number of different compressed audio programs, each of which is compressed using the Motion Pictures Expert Group (MPEG) compressed audio format. In this embodiment, there are six compressed audio programs in each block (B), which is practical for video CD coding. Each compressed audio program is segmented to form a number (k) of consecutive audio sectors (AS(i,j), i=0 to 5, j=0 to k-1). The audio sectors AS (i, j) of the audio programs are interleaved so that the constant linear velocity, i.e. 1.5 Mbits/sec, of the CD drive of a playback apparatus can be retained with a compressed audio bit rate of about 224 Kbits/sec. Particularly, the audio sectors AS(i,j) are arranged among k consecutive sub-blocks such that a jth one of the audio sectors AS(i,j) of each of the compressed audio programs is disposed in a jth one of the sub-blocks. That is to say, the first audio sectors AS(i,0) of the compressed audio programs are in the first sub-block, the second audio sectors AS (i, 1) are in the second sub-block, the third audio sectors AS(i,2) are in the third sub-block, and so on. The compressed audio programs are assigned with an ascending order of program numbers. In each sub-block, the audio sectors AS(i,j) are arranged in the ascending order of the compressed audio programs to which they belong. That is to say, the audio sector AS(1,j) of the second compressed audio program follows the audio sector AS(0,j) of the first compressed audio program, the audio sector AS(2,j) of the third compressed audio program follows the audio sector AS(1,j) of the second compressed audio program, and so on.

Figure 6:
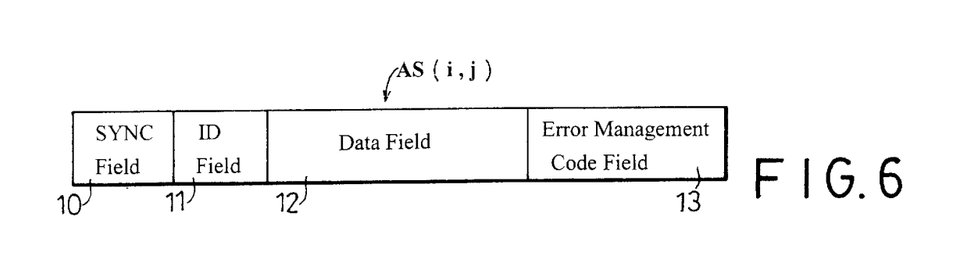
FIG. 6 illustrates an audio sector of the block shown in FIG. 5.

As shown in FIG. 6, each audio sector AS(i,j) includes a SYNC field 10, an ID field 11, a data field 12 and an error management code field 13. The SYNC field 10, the data field 12 and the error management code field 13 are similar to those originally defined in a standard video CD sector. The SYNC field 10 contains a SYNC word therein. The error management code field 13 contains an error management code that includes an error detection code and an error correction code, such as those commonly found in standard CD-ROM and video CD. The ID field 11 contains an ID code that is unique for each of the audio sectors AS(i,j). The ID code is used to distinguish the interleaved audio sectors AS(i,j) on the record carrier, and can thus be used to control correct and continuous extraction of the audio sectors AS(i,j) when the compressed audio programs are read from the record carrier.

Figure 7:
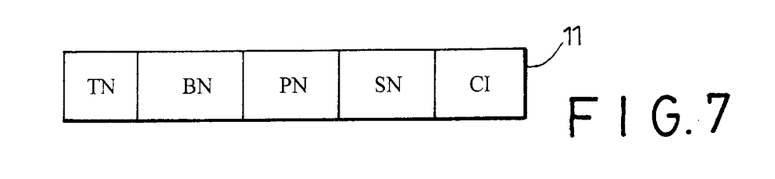
FIG. 7 illustrates an ID field of the audio sector shown in FIG. 6.

Referring to FIG. 7, in combination with FIGS. 4 to 6, the ID field 11 includes a track number (TN), a block number (BN), a program number (PN), a sector number (SN) and connection information (CI). The track number (TN) indicates the track (T) of the record carrier to which the audio sector AS (i,j) belongs. The block number (BN) indicates the block (B) on the track (T) to which the audio sector AS(i,j) belongs, e.g. (m) or (m+1) as shown in FIG. 4. The program number (PN) indicates the compressed audio program on the block (B) to which the audio sector AS(i,j) belongs, e.g. i=0 to 5 as shown in FIG. 5. The sector number (SN) indicates the sector number of the audio sector AS(i,j) in the compressed audio program to which the audio sector AS(i,j) belongs, e.g. j=0 to k-1 as shown in FIG. 5. The connection information (CI) contains flags for facilitating continuous playback of the compressed audio programs when the record carrier is read. The flags can include an end of program (EOP) flag, an end of block (EOB) flag, an end of track (EOT) flag, and an end of disc (EOD) flag. In the preferred embodiment, the last audio sector of each of the compressed audio programs, i.e. AS(i,k-1), has an EOP flag. The last audio sector of each block (B), i.e. AS (5,k-1), further has an EOB flag. The last audio sector AS(5,k-1) of the last block (B) in a track (T) further has an EOT flag. The last audio sector AS(5,k-1) of the last block (B) in the last track (T) of the record carrier further has an EOD flag.

In the preferred embodiment, shorter ones of the compressed audio programs are padded with stuffing bytes so as to be equal in length with a longest one of the compressed audio programs. As such, the lengths of the audio sectors AS(i,j) can be made equal in the record carrier of this embodiment.

Figure 8:
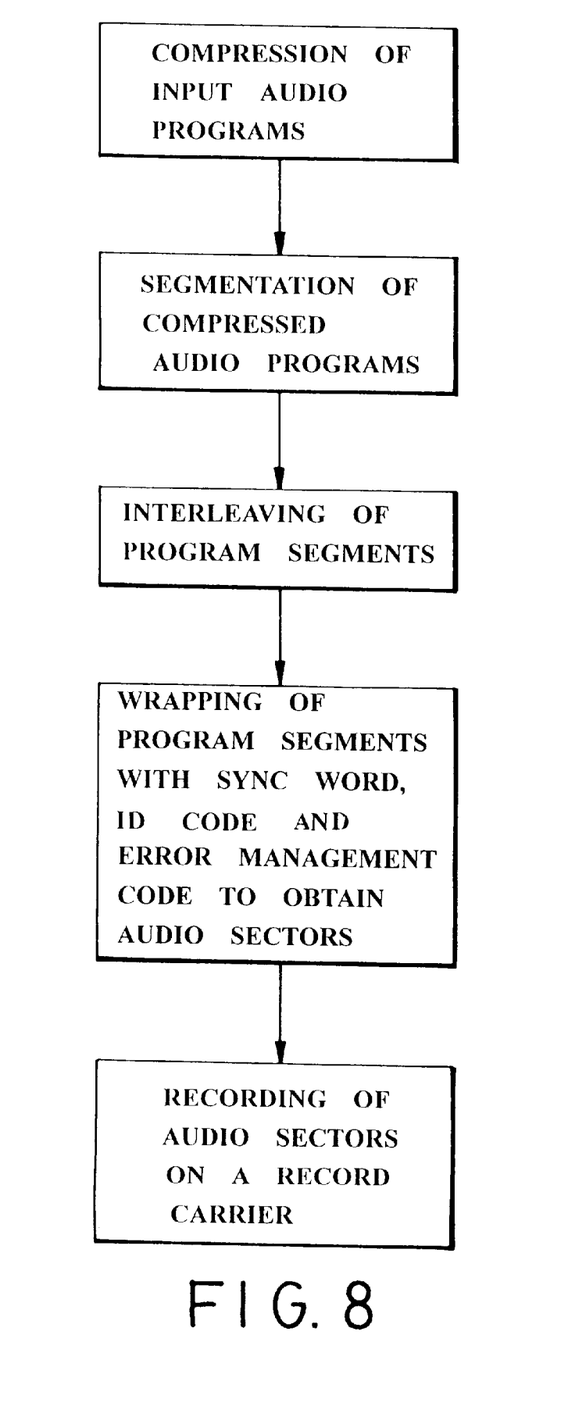
FIG. 8 is a flowchart illustrating the preferred embodiment of a recording method according to the present invention.
Figure 9A:
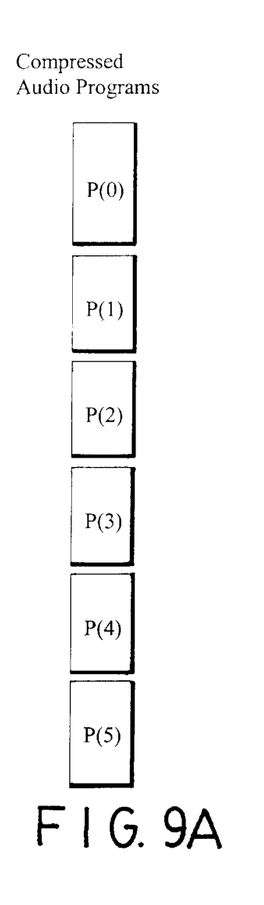
FIG. 9A shows compressed audio programs after an audio compression operation in accordance with the recording method of the preferred embodiment.

Referring to FIG. 8, the preferred embodiment of a recording method for recording compressed audio programs on a track of a record carrier, such as a compact disc, according to the present invention is shown to comprise the following steps:

1. Initially, six input audio programs of different lengths are compressed, such as with the use of the MPEG compressed audio format, to obtain six compressed audio programs P(0)–P(5), as shown in FIG. 9A. The compressed audio programs P(0)–P(5) are assigned with an ascending order of program numbers, and cooperatively form a block to be recorded on the track.

Figure 9B:
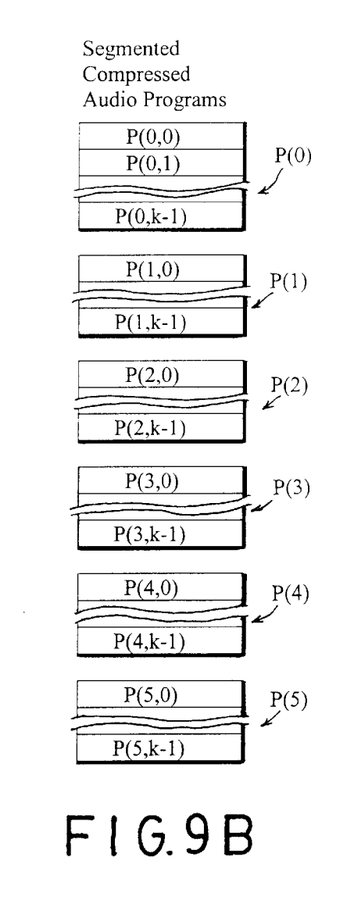
FIG. 9B shows segmented compressed audio programs after a segmentation operation in accordance with the recording method of the preferred embodiment.

2. Thereafter, each of the compressed audio programs P(0)–P(5) is segmented into an equal number (k) of consecutive compressed audio program segments, as shown in FIG. 9B. Preferably, the compressed audio program segments P(0,0) to P(5,k-1) have equal lengths so that all of the segmented compressed audio programs P(0)–P(5) have the same length. The number (k) is determined by the length of the longest compressed audio program. In the example of FIG. 9A, the compressed audio program P(2) has the longest length. The shorter compressed audio programs P(0),P(1), P(3), P(4),(P5) are padded with stuffing bytes so that the lengths of all of the segmented compressed audio programs P(0)–P(5) can be made equal.

Figure 9C:
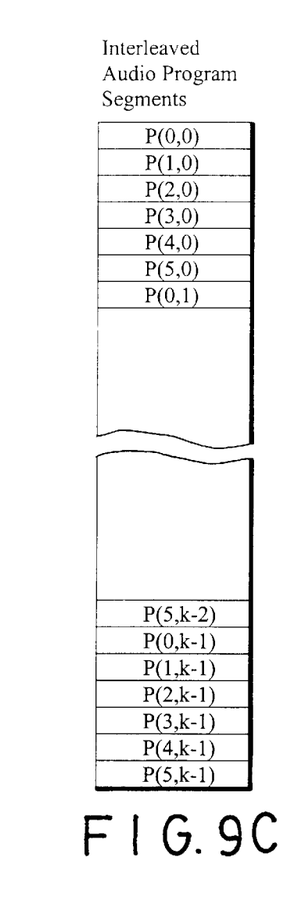
FIG. 9C shows interleaved audio program segments after an interleaving operation in accordance with the recording method of the preferred embodiment.

3. As shown in FIG. 9C, the compressed audio program segments are interleaved by grouping together the first segments of the compressed audio programs, the second segments of the compressed audio programs, and so on to form an ascending order of k consecutive groups. In each group, the compressed audio program segments are arranged in the ascending order of the compressed audio programs to which they belong.

Figure 9D:
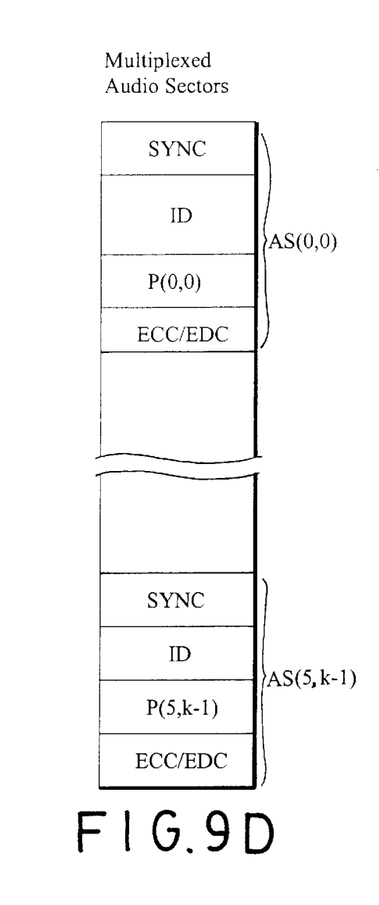
FIG. 9D shows multiplexed audio sectors after a multiplexing operation in accordance with the recording method of the preferred embodiment.

4. Referring to FIG. 9D, each of the compressed audio program segments is wrapped with a SYNC word, an ID code (see FIG. 7) that is unique for each of the compressed audio program segments, and an error management code that includes at least one of an error correction code and an error detection code, to form audio sectors AS(i,j) corresponding to the compressed audio program segments. The form of the ID code has been described beforehand with reference to FIG. 7 and will not be repeated herein.

5. Finally, the audio sectors AS(i,j) are recorded on the track of the record carrier in a known manner with the use of a conventional recording mechanism.

Preferably, the audio sectors AS (i, j) are scrambled via a specific scrambling algorithm prior to recording on the record carrier to facilitate storage and to increase the noise margin when the audio sectors AS (i, j) are read from the record carrier.

Figure 10:
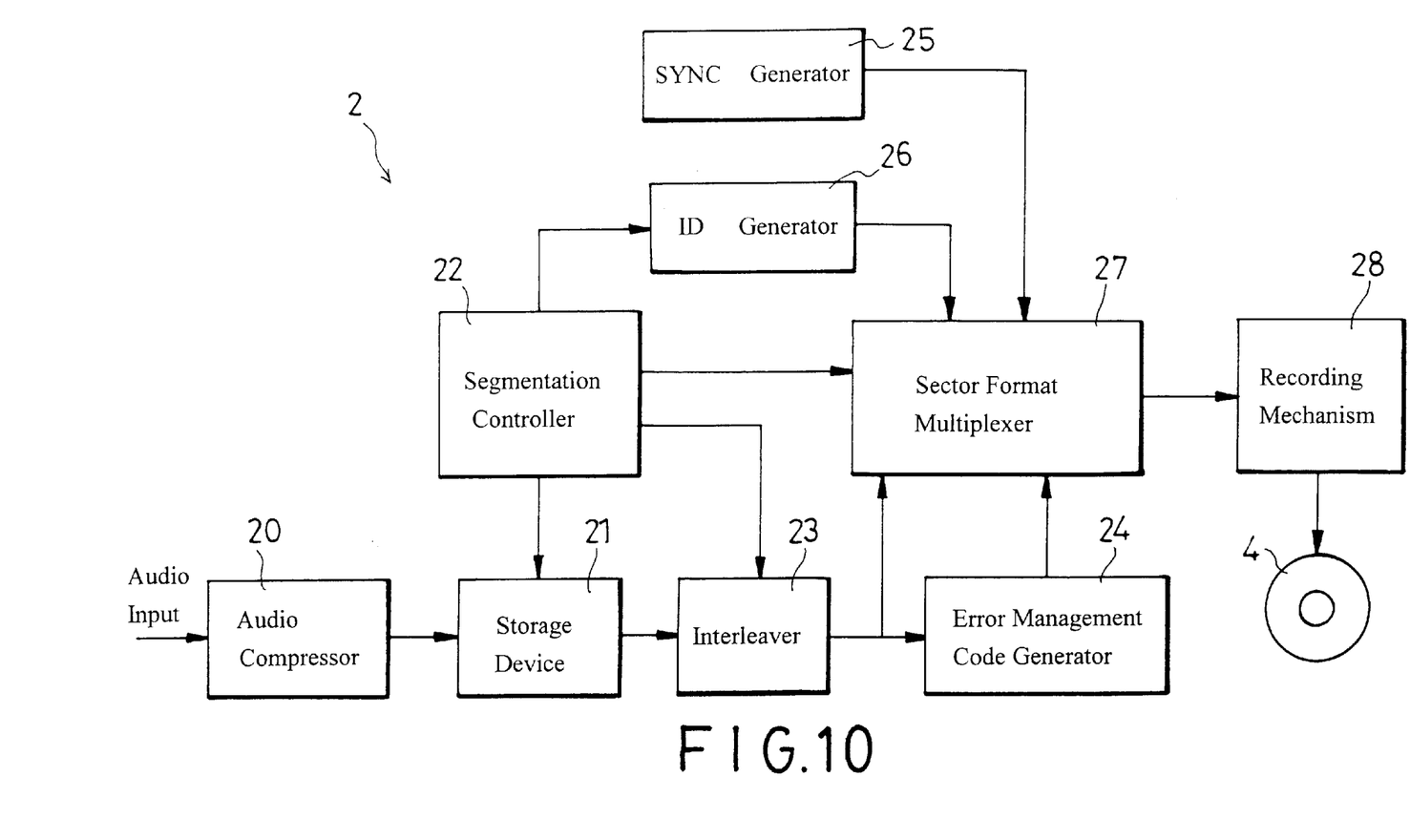
FIG. 10 is a schematic circuit block diagram of the preferred embodiment of a recording apparatus for recording compressed audio programs on a track of a record carrier in accordance with the present invention.

Referring to FIG. 10, the preferred embodiment of a recording apparatus 2 for recording compressed audio programs on a track of a record carrier 4, such as a compact disc, is shown to comprise an audio compressor 20, segmentation means constituted by a storage device 21 and a segmentation controller 22, an interleaver 23, an error management code generator 24, a SYNC generator 25, an ID generator 26, a sector format multiplexer 27 and a recording mechanism 28.

The audio compressor 20 receives input audio programs and is adapted to compress the same with the use of a compression algorithm, such as the MPEG compressed audio format. The audio compressor 20 is connected to the storage device 21, such as a memory unit, and stores the compressed audio programs in the latter. In this embodiment, as many as six different compressed audio programs (see FIG. 9A) are stored in the storage device 21 for recording on the track of the record carrier 4.

The segmentation controller 22 is connected to the storage device 21 and is responsible for segmenting the compressed audio programs into equal numbers of consecutive compressed audio program segments (see FIG. 9B). Preferably, the segmentation controller 22 pads shorter ones of the compressed audio programs with stuffing bytes so that the lengths of the compressed audio program segments can be made equal. The segmentation controller 22 stores the compressed audio program segments in the storage device 21.

The interleaver 23 is connected to the storage device 21 and the segmentation controller 22, and is controlled by the segmentation controller 22 to read and output sequentially the compressed audio program segments in the storage device 21 in a predefined manner to produce interleaved compressed audio program segments in the form of a serial bit stream output. As shown in FIG. 9C, the interleaver 23 first reads the first segments of the compressed audio programs in an ascending order of program numbers that are assigned to the latter, before proceeding to read the second segments of the compressed audio programs, followed by the third segments and so on.

The error management code generator 24 is connected to the interleaver 23, and generates an error management code that includes at least one of an error detection code (EDC) and an error correction code (ECC), for each of the compressed audio program segments outputted by the interleaver 23 in a conventional manner using known error management algorithms.

The SYNC generator 25 generates a SYNC word. The ID generator 26, which is connected to the segmentation controller 22, receives segmentation information for each of the compressed audio program segments from the segmentation controller 22, and generates a corresponding ID code that is unique for each of the compressed audio program segments. Details of the ID code have been described beforehand with reference to FIG. 7 and will not be repeated herein.

The sector format multiplexer 27 is connected to the segmentation controller 22, the interleaver 23, the error management code generator 24, the SYNC generator 25 and the ID generator 26. Under the control of the segmentation controller 22, the sector format multiplexer 27 wraps each of the compressed audio program segments from the interleaver 23 with the SYNC word from the SYNC generator 25, the respective ID code from the ID generator 26, and the respective error management code from the error management code generator 24 to form audio sectors AS(i,j) corresponding to the compressed audio program segments, as shown in FIG. 9D. The multiplexed audio sectors AS (i, j) form one block (B) (see FIG. 5) to be recorded on the track (T) of the record carrier 4.

The recording mechanism 28 is connected to the sector format multiplexer 27 and is adapted to record the multiplexed audio sectors AS(i,j) on the track of the record carrier 4 in a conventional manner.

A scrambler (not shown) may be provided between the sector format multiplexer 27 and the recording mechanism 28 to scramble the multiplexed audio sectors AS(i,j) prior to recording on the track of the record carrier 4.

Figure 11:
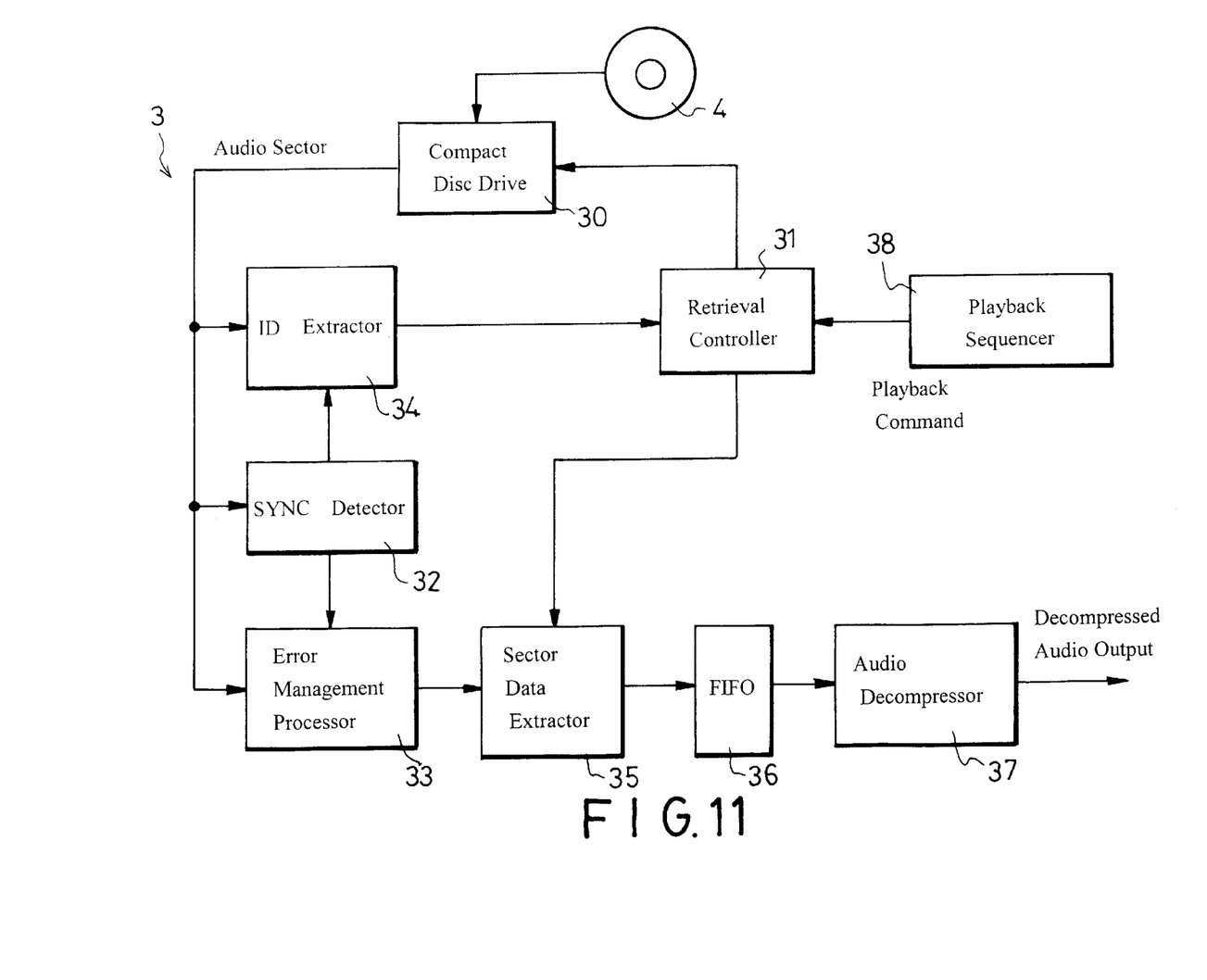
FIG. 11 is a schematic circuit block diagram of a playback apparatus for reading compressed audio programs from a track of the record carrier of this invention.

FIG. 11 illustrates a playback apparatus 3 for reading compressed audio programs from a track of the record carrier 4 of this invention. The playback apparatus 3 includes a compact disc drive 30 that is used to read the record carrier 4 under the control of a retrieval controller 31. The compact disc drive 30 outputs the audio sectors that are recorded on the record carrier 4 to a SYNC detector 32, an error management processor 33 and an ID extractor 34.

The SYNC detector 32 detects the SYNC word in an audio sector, and activates the error management processor 33 and the ID extractor 34 to receive the respective fields of the audio sector upon detection of the SYNC word.

Upon being activated by the SYNC detector 32, the error management processor 33 receives the data field and the error management code field of the audio sector, and proceeds to perform error management operations, such as error detection and error correction, on the data field according to the error management code in the error management code field. The output of the error management processor 33 is an original segment of a compressed audio program.

Upon being activated by the SYNC detector 32, the ID extractor 34 receives the ID field of the audio sector, and sends the extracted ID code to the retrieval controller 31.

The retrieval controller 31 receives the ID code from the ID extractor 34 and a playback command from a known playback sequencer 38 to determine which audio sector on the record carrier 4 must be read for playback. The retrieval controller 31 outputs an enable signal and controls the reading of audio sectors by the compact disc drive 30 according to the playback command that was issued and the ID code of the previous audio sector that was read.

A sector data extractor 35 receives the output of the error management processor 33, and extracts sector data therefrom upon receipt of the enable signal from the retrieval controller 31. The sector data extractor 35 stores the extracted sector data in a first-in, first-out (FIFO) memory device 36. The FIFO memory device 36 collects the extracted sector data and provides the same to an audio decompressor 37 for decompression so as to recover the original audio programs. The audio decompressor 37 decompresses the data stored in the FIFO memory device 36 according to the compression algorithm used in the audio compressor 20 of FIG. 10.

If the audio sectors recorded on the record carrier 4 are scrambled, a corresponding descrambler (not shown) is needed at the output side of the compact disc drive 30 to descramble the audio sectors before they can be decoded.

By virtue of the interleaving arrangement of the audio sectors on the record carrier 4 of this invention, a high density of compressed audio programs can be recorded on tracks of the record carrier 4 while retaining the constant linear velocity, i.e. 1.5 Mbits/sec, of the compact disc drive 30 with a compressed audio bit rate of about 224 Kbits/sec, thereby obviating the need for the compact disc drive 30 to alternate frequently between stalling and advancing states to minimize degradation of the compact disc drive 30 when the compressed audio programs are read from the record carrier 4. The objects of the present invention are thus met.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A record carrier comprising at least one track, said track having at least one block, said block including a plurality of interleaved compressed audio programs and being grouped into a number of consecutive sub-blocks, each of said compressed audio programs being segmented to form a number of consecutive audio sectors that is equal in number to said sub-blocks, said audio sectors of said compressed audio programs being arranged among said sub-blocks such that a jth one of said audio sectors of each of said compressed audio programs is disposed in a jth one of said sub-blocks.

2. The record carrier as claimed in claim 1, wherein said record carrier is a compact disc.

3. The record carrier as claimed in claim 1, wherein said compressed audio programs are assigned with an ascending order of program numbers, said audio sectors in each of said sub-blocks being arranged in the ascending order of said compressed audio programs to which said audio sectors belong.

4. The record carrier as claimed in claim 1, wherein said compressed audio programs are MPEG compressed audio programs.

5. The record carrier as claimed in claim 4, wherein said block includes six of said compressed audio programs.

6. The record carrier as claimed in claim 1, wherein each of said audio sectors includes a SYNC field for storing a SYNC word, an ID field for storing an ID code that is unique for each of said audio sectors, and a data field.

7. The record carrier as claimed in claim 6, wherein each of said audio sectors further includes an error management code field for storing an error management code, said error management code including at least one of an error detection code and an error correction code.

8. The record carrier as claimed in claim 6, wherein said ID code includes a program number to indicate said compressed audio program on said block to which said audio sector belongs, and a sector number to indicate sector number of said audio sector in said compressed audio program to which said audio sector belongs.

9. The record carrier as claimed in claim 8, wherein said ID code further includes a block number to indicate said block on said track to which said audio sector belongs.

10. The record carrier as claimed in claim 9, wherein said ID code further includes a track number to indicate said track of said record carrier to which said audio sector belongs.

11. The record carrier as claimed in claim 1, wherein shorter ones of said compressed audio programs are padded with stuffing bytes so as to be equal in length with a longest one of said compressed audio programs.

12. The record carrier as claimed in claim 11, wherein said audio sectors have equal lengths.

13. The record carrier as claimed in claim 1, wherein said audio sectors have equal lengths.

14. A recording method for recording a plurality of input audio programs on a track of a record carrier, comprising:
    compressing the input audio programs to obtain a plurality of compressed audio programs;
    segmenting the compressed audio programs into equal numbers of consecutive compressed audio program segments; and
    interleaving the compressed audio programs segments of the compressed audio programs by grouping together jth ones of the compressed audio program segments of the compressed audio programs in a jth one of an ascending order of consecutive groups to form a block.

15. The recording method of claim 14, wherein the record carrier is a compact disc.

16. The recording method of claim 14, wherein the compressed audio programs are assigned with an ascending order of program numbers, the compressed audio program segments in each of the groups being arranged in the ascending order of the compressed audio programs to which the compressed audio program segments belong during interleaving of the compressed audio program segments.

17. The recording method of claim 14, wherein the input audio programs are compressed using MPEG compressed audio format.

18. The recording method of claim 17, wherein the block includes six of the compressed audio programs.

19. The recording method of claim 14, further comprising:
    wrapping each of the compressed audio program segments with a SYNC word and an ID code that is unique for each of the compressed audio program segments to form audio sectors corresponding to the compressed audio program segments; and
    recording the audio sectors on the track of the record carrier.

20. The recording method of claim 19, wherein each of the compressed audio program segments is further wrapped with an error management code that includes at least one of an error detection code and an error correction code.

21. The recording method of claim 19, wherein the ID code includes a program number to indicate the compressed audio program on the block to which the audio sector belongs, and a sector number to indicate sector number of the audio sector in the compressed audio program to which the audio sector belongs.

22. The recording method of claim 21, wherein the ID code further includes a block number to indicate the block on the track to which the audio sector belongs.

23. The recording method of claim 22, wherein the ID code further includes a track number to indicate the track of the record carrier to which the audio sector belongs.

24. The recording method of claim 19, further comprising scrambling the audio sectors prior to recording on the record carrier.

25. The recording method of claim 14, further comprising padding of shorter ones of the compressed audio programs with stuffing bytes so that the shorter ones of the compressed audio programs are equal in length with a longest one of the compressed audio programs when segmenting the compressed audio programs.

26. The recording method of claim 25, wherein the compressed audio program segments have equal lengths.

27. The recording method of claim 14, wherein the compressed audio program segments have equal lengths.

28. A recording apparatus for recording a plurality of input audio programs on a track of a record carrier, comprising:
    an audio compressor adapted to compress the input audio programs to obtain a plurality of compressed audio programs;
    segmentation means, connected to said audio compressor, for segmenting the compressed audio programs into equal numbers of consecutive compressed audio program segments; and
    interleaving means, connected to said segmentation means, for interleaving the compressed audio programs segments by grouping together jth ones of the compressed audio program segments of the compressed audio programs in a jth one of an ascending order of consecutive groups to form a block.

29. The recording apparatus as claimed in claim 28, wherein the record carrier is a compact disc.

30. The recording apparatus as claimed in claim 28, wherein the compressed audio programs are assigned with an ascending order of program numbers, the compressed audio program segments in each of the groups being arranged by said interleaving means in the ascending order of the compressed audio programs to which the compressed audio program segments belong.

31. The recording apparatus as claimed in claim 28, wherein said audio compressor is adapted to compress the input audio programs using MPEG compressed audio format.

32. The recording apparatus as claimed in claim 28, wherein said segmentation means comprises:
    a storage device, connected to said audio compressor, for storing the compressed audio programs from said audio compressor therein; and
    a segmentation controller, connected to said storage device, for segmenting the compressed audio programs in said storage device into the consecutive compressed audio program segments that are stored in said storage device.

33. The recording apparatus as claimed in claim 32, wherein said interleaving means is connected to said storage device and said segmentation controller, and is controlled by said segmentation controller to read and output sequentially the groups of the compressed audio program segments in said storage device.

34. The recording apparatus as claimed in claim 33, further comprising:

a SYNC generator for generating a SYNC word;

an ID generator, connected to and controlled by said segmentation controller, so as to generate an ID code that is unique for each of the compressed audio program segments outputted by said interleaving means;

a sector format multiplexer connected to said segmentation controller, said interleaving means, said SYNC generator and said ID generator, said sector format multiplexer being controlled by said segmentation controller so as to wrap each of the compressed audio program segments outputted by said interleaving means with the SYNC word from said SYNC generator and the respective ID code from said ID generator to form audio sectors corresponding to the compressed audio program segments; and a recording mechanism connected to said sector format multiplexer and adapted to record the audio sectors on the track of the record carrier.

35. The recording apparatus as claimed in claim 34, further comprising an error management code generator connected to said interleaving means and said sector format multiplexer, said error management code generator generating an error management code for each of the compressed audio program segments from said interleaving means, said sector format multiplexer further wrapping each of the compressed audio program segments outputted by said interleaving means with the respective error management code from said error management code generator.

36. The recording apparatus as claimed in claim 35, wherein the error management code includes at least one of an error detection code and an error correction code.

37. The recording apparatus as claimed in claim 34, wherein the ID code includes a program number to indicate the compressed audio program on the block to which the audio sector belongs, and a sector number to indicate sector number of the audio sector in the compressed audio program to which the audio sector belongs.

38. The recording apparatus as claimed in claim 37, wherein the ID code further includes a block number to indicate the block on the track to which the audio sector belongs.

39. The recording apparatus as claimed in claim 38, wherein the ID code further includes a track number to indicate the track of the record carrier to which the audio sector belongs.

40. The recording apparatus as claimed in claim 28, wherein said segmentation means pads shorter ones of the compressed audio programs with stuffing bytes so that the shorter ones of the compressed audio programs are equal in length with a longest one of the compressed audio programs.

41. The recording apparatus as claimed in claim 40, wherein the audio program segments have equal lengths.

42. The recording apparatus as claimed in claim 28, wherein the audio program segments have equal lengths.

* * * * *